United States Patent [19]

Kuehnle

[11] 4,028,992
[45] June 14, 1977

[54] METHOD AND MEANS FOR MAKING HELICAL RACES

[76] Inventor: Manfred R. Kuehnle, 6 Linmoor Terrace, Lexington, Mass. 02173

[22] Filed: Nov. 20, 1975

[21] Appl. No.: 633,642

[52] U.S. Cl. ............................. 90/11 C; 51/33 W; 90/15 A; 90/30
[51] Int. Cl.² ...................... B23C 3/18; B23C 3/34
[58] Field of Search ............... 90/11 C, 15 R, 15 A, 90/15.1, 20, 30; 51/33 W

[56] References Cited

UNITED STATES PATENTS

| | | | |
|---|---|---|---|
| 3,745,712 | 7/1973 | Hassman | 51/33 W |
| 3,753,319 | 8/1973 | Mesey | 51/48 HE X |
| 3,916,569 | 11/1975 | Wydler et al. | 51/33 W |

*Primary Examiner*—Othell M. Simpson
*Assistant Examiner*—Z. R. Bilinsky
*Attorney, Agent, or Firm*—Cesari and McKenna

[57] ABSTRACT

Helical races are formed in a curved work-piece using a suitable cutting tool by performing a double rotation of the tool and work-piece about orthogonal axes. The double rotation maintains the tool at a uniform attack angle relative to the work-piece as it forms each race with the result that the race has a uniform cross-section along its entire length.

6 Claims, 4 Drawing Figures

METHOD AND MEANS FOR MAKING HELICAL RACES

BACKGROUND OF THE INVENTION

This invention relates to method and means for making helical races. It relates more particularly to a technique for inscribing helical races having a uniform cross-section in a curved work-piece.

There has recently been developed a transmission which transmits power from an input shaft to an output shaft by way of a multiplicity of circular ball bearing units driven by a worm on the output shaft and whose bearings follow spaced-apart, helical races inscribed in a wall of a toroidal enclosure. A transmission such as this is dislcosed in U.S. Pat. No. Re. 26,476.

It has been found that considerable care must be taken in fabricating the toroidal enclosures for such transmissions so that the races inscribed in the enclosures have uniform cross-section and relative pitch along their entire lengths. Indeed, it has not been possible heretofore to manufacture toroidal helical enclosures which meet the mathematical requirements of constant cross section of the races and varying lead angle in accordance with the requirement of uniform rotational output motion.

It should be clearly understood at this point that it is imperative that the toroidal helical races in such transmissions be extremely uniform and precisely related to the axis of the helix which coincides with the axis of rotation of the worm in order for the transmission to function properly. Without these constraints, the bearings are loaded unevenly contributing to excessive bearing wear. Further, certain bearings in the bearing units begin to disengage from the driving worm at certain times. These "loose" bearings begin to trail the others because they are not rotated enough so that they tend to "buck" the advancement of the bearing units within the housing.

Accordingly, the present invention aims to provide a method for making accurately formed helical races in a curved work-piece.

Another object of the invention is to provide a method for making races of this type having a uniform cross-section.

Yet another object of the invention is to provide a method for inscribing helical races having a uniform cross-section in the surface of a toroidal enclosure.

A further object of the invention is to provide apparatus for inscribing accurately toroidal helical races in a toroidal enclosure which are precisely positioned relative to each other and also to the axis of the enclosure.

Other objects will, in part, be obvious and will, in part, appear hereinafter.

The invention accordingly comprises the several steps and the relation of one or more of such steps with respect to each of the others, and the apparatus embodying the features of construction, combination of elements and arrangement of parts which are adapted to effect such steps, all as exemplified in the following detailed description, and the scope of the invention will be indicated in the claims.

In general, the present apparatus forms helical races in a curved work-piece by performing a double rotation of the cutting tool and work-piece about orthogonal axes. The rotations are synchronized so that the tool is maintained at a uniform attack angle relative to the work-piece as the races are formed with the result that the races have a uniform cross-section along their entire lengths.

The apparatus supports the work-piece on a rotary work-table which turns about a vertical axis. The cutting tool is supported directly above the work-table by a rotary yoke which turns about a horizontal axis. The work-table and yoke operate together so that when the work-table is turned by a suitable electrical motor, the cutting tool is swung through an arc whose radius corresponds to the radius of the helical races being formed in the work-piece. The pitch of the races on the other hand is determined by the ratio between the advance of the work-table and the advance of the yoke.

The present apparatus greatly simplifies the formation of mathematically correct, even helical races in toroidal transmissions of the type described in the above patent. As a result of the precisely controlled double rotation of the cutting tool and work-piece, helical races can be formed in toroidal transmission enclosures which are uniform cross-section and are precisely positioned relative to each other and are precisely positioned relative to the axis of the toroidal enclosure. Resultantly, the bearings in transmissions made by this technique all share the applied load equally and are uniformly engaged by the driving worm. Consequently, bearing wear is minimized and the transmission operates at maximum efficiency. Still, however, the present apparatus is relatively easy to operate and maintain.

BRIEF DESCRIPTION OF THE DRAWING

For a fuller understanding of the nature and objects of the invention, reference should be had to the following detailed description, taken in connection with the accompanying drawing in which.

DESCRIPTION OF THE PREFERRED EMBODIMENT

Figure 1:
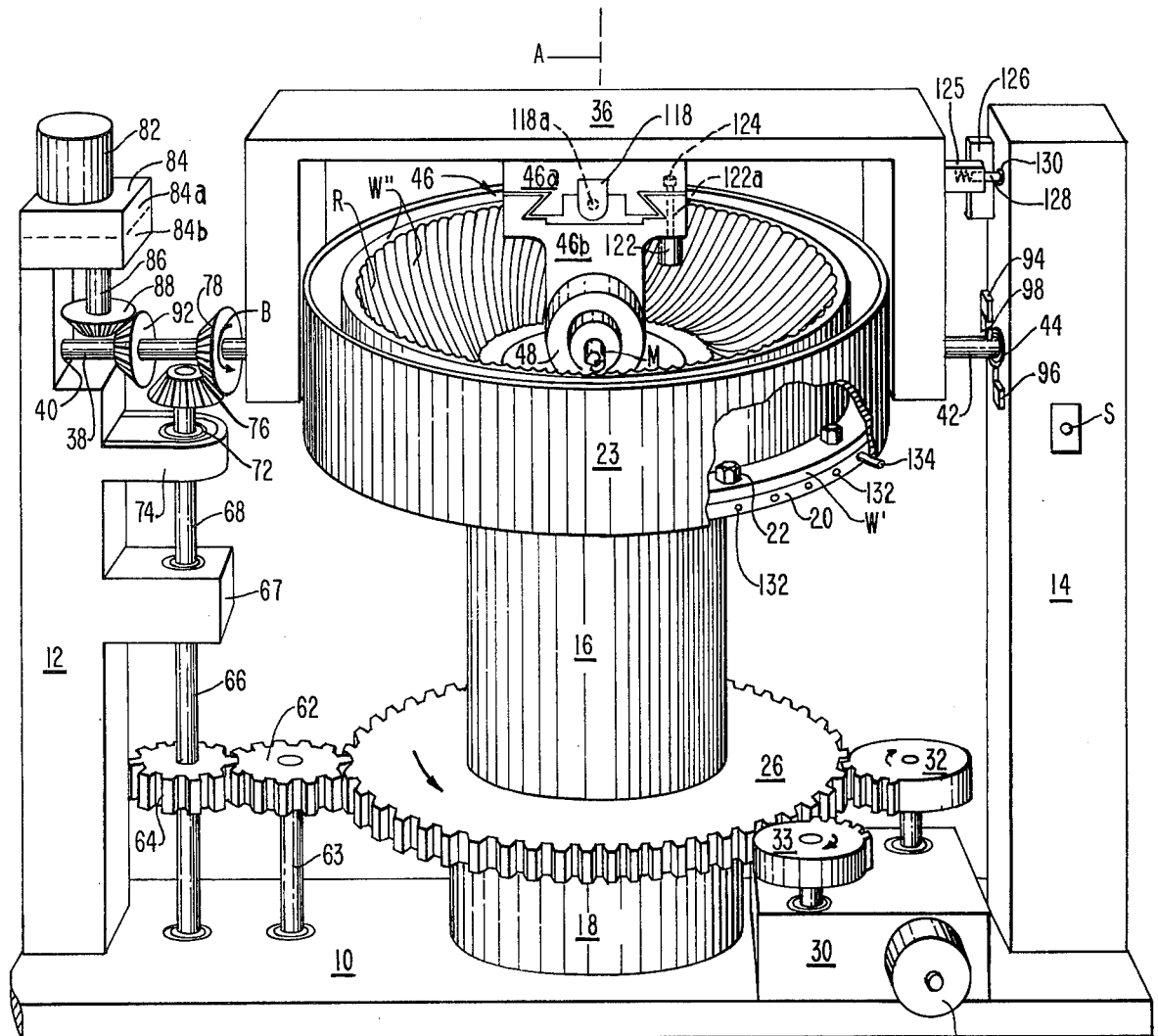
FIG. 1 is a diagrammatical view of apparatus for forming helical races in a toroidal enclosure embodying the principles of this invention.

Turning now to FIG. 1 of the drawing, the present apparatus includes a very sturdy, stable, rectangular base 10 supporting a pair of standards 12 and 14 which extend up from the base at each end thereof. A relatively large diameter upstanding pillar 16 has its lower end journalled in a bearing 18 set into base 10 midway between standards 12 and 14. Bearing 18 is both a rotary bearing and a thrust bearing so that pillar 16 is free to rotate relative to the base despite downward forces exerted on the pillar.

Mounted on the top of pillar 16 is a circular work-table 20 of a size adequate to support the desired work-piece W.

The illustrated work-piece W is the lower section of an enclosure for a toroidal transmission such as the one shown in the above patent. The work-piece is secured to table 20 by means of bolts 22 which extend through suitable openings spaced around a flange W' on the work-piece. These bolts are turned down into threaded openings (not shown) in the top of table 20 so that the piece W is centered on the axis of pillar 16. Also a protective shield 23 encircles the table 20 and work-piece W to protect the operator.

Figure 2:
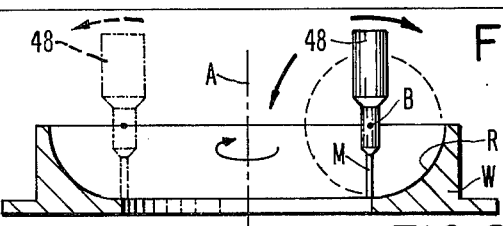
FIGS. 2 and 3 are diagrammatic views showing the changing relationship between the work-piece and the cutting tool in FIG. 1 apparatus.
Figure 3:
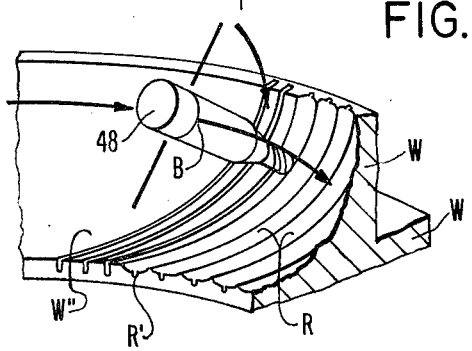

Preferably the work-piece is drop-forged of steel so that it has the proper shape for the section. Specifically, it has a concave central portion W" in which are rough formed by the forging process a series of spaced-apart helical races R. In the transmission with which I am especially concerned, the bearings do not ride at the bottom of the races. Rather the races have a "Gothic Arch" profile, or circular groove with a bottom rille, and the bearings engage the sides of the races at points spaced apart by an angle of, say 60°. Consequently, during the foregoing process, a small groove is formed at the bottom of each race or the races can be undercut to accommodate any dirt present and to provide a path for lubricating oil. These grooves are indicated at R' in FIG. 3. The present apparatus gives these races their final shape as will be described presently. When combined with a mating upper section of the transmission, the work-piece W forms a toroidal enclosure in whose walls are formed the races which control the movement of the bearing units in that transmission. As best seen in FIGS. 2 and 3, the dished portion W" of the work-piece has a uniform first radius about its vertical axis A, but also a uniform smaller radius of curvature about a circular axis B lying in a plane perpendicular to the axis A.

Referring again to FIG. 1, work-table 20 and consequently work-piece W are rotated about the vertical axis A by a large gear 26 encircling pillar 16 near its lower end. An electric motor 28 mounted on base 10 drives a gear-clutch mechanism 30. A pair of segmented spur gears 32 and 33 connected to two outputs of mechanism 30 mesh with gear 26, and one or the other turns the pillar in a counter-clockwise direction as indicated by the arrow in FIG. 1 as will be described later.

A sturdy yoke 36 is positioned directly above work-table 20. A stub shaft 38 projects out horizontally from the left end of yoke 36 and is journalled at 40 in standard 12. A similar shaft 42 projects out horizontally from the right end of yoke 36 and is journalled at 44 in standard 14. Shafts 38 and 42 are so positioned relative to work-table 20 that the yoke 36 rotates about the work-piece axis B (FIGS. 2 and 3).

Mounted at the middle of yoke 36 is a fixture shown generally at 46 which supports a cutting tool 48. Tool 48 supports and rotates the device which actually gives the races R their final shape. In the illustrative embodiment of the invention which is designed to cut races having a rounded cross section, the device is a ball end mill M whose cutting cross-section corresponds to the cross-section of a finished race R. It should be understood, however, that other suitable cutting devices can be employed such as an abrasive ball, a spark erosion electrode or a conventional chemical milling device.

Thus when yoke 36 is rotated about its axis, the working end of mill M is swung in a semi circle about the axis of the yoke corresponding to axis B as seen in FIGS. 2 and 3. The distance between the end of the mill and axis B is such that the mill M removes only enough material from the unfinished races R formed during the forging of the work-piece to give the races smooth finished walls and a uniform cross-section. About 0.002 inch is a typical thickness of removed material.

Referring to FIG. 1, the work-table 20 and the yoke 36 are arranged to turn in synchronism with one another. More particularly, a spur gear 62 on the end of a shaft 63 journalled in base 10 meshes with gear 26. Gear 26 also meshes with a similiar gear 64 mounted on a vertical shaft 66. The lower end of that shaft 66 is journalled at base 10, while its upper end is connected to the input of a normally engaged, solenoid-actuated clutch 67. The clutch output is connected to the lower end of a shaft 68 which is also journalled at 72 to an ear 74 projecting laterally from standard 12. The upper end of shaft 68 terminates in a bevel gear 76 which meshes with a similar gear 78 on shaft 38. Thus when work-table 20 is rotated in a counter-clockwise direction and clutch 67 is engaged, yoke 36 rotates in the direction indicated by the arrow just to the right of gear 78 to move mill M downwards from its position in FIG. 1 to its position in FIG. 2. On the other hand, when clutch 67 is disengaged, the work-table and the yoke can be moved independently of one another.

Of course, other different kinds of mechanical or electro-mechanical linkage may be employed between yoke 36 and pillar 16 to make those elements turn in unison when it is desired for that to occur.

Yoke 36 can also be turned by a motor 82 which drives a gear-clutch mechanism 84 mounted on the top of standard 12. Mechanism 83 consists of a step down gear box section 84a followed by a normally disengaged solenoid-actuated clutch section 84b. The output of the mechanism is taken from a shaft 86 depending from mechanism 84 and terminating in a bevel gear 88. Gear 88 meshes with a similar bevel gear 92 mounted on shaft 38 outboard of gear 78.

Clutch section 84b is normally disengaged when clutch 67 is engaged as the mill M is cutting a race R. Upon completion of each race, the clutch 67 is disengaged and clutch section 84b is engaged so that the motor 82 turns shaft 38 and yoke 36 at a fairly rapid rate in a direction opposite that indicated by the arrow to return the mill M from its FIG. 2 position to its original position shown in FIG. 1.

The clutches 67 and 84b are controlled by a pair of limit switches 94 and 96 mounted on standard 14 which are tripped by a pin 98 projecting out from stub shaft 42 adjacent to pillar 14 when the mill M is in its FIG. 1 and FIG. 2 positions. Operation of these clutches and switches will be described in detail now in connection with FIG. 4.

Figure 4:
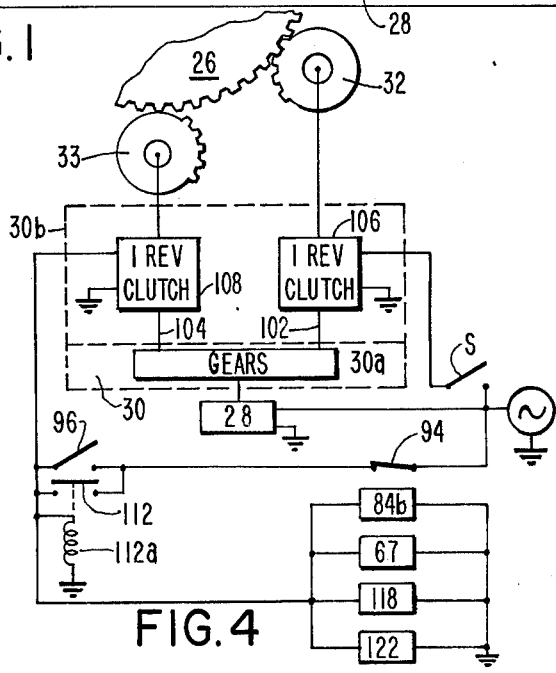
FIG. 4 is a schematic diagram of the control system in the FIG. 1 apparatus.

Referring to FIGS. 1 and 4, the mechanism 30 in FIG. 1 comprises a gear section 30a and a clutch section 30b. The gear section 30a is driven by motor 28 and produces a pair of outputs on shafts 102 and 104 leading to the clutch section 30b. Shaft 102 is connected to the input of a single revolution solenoid-actuated clutch 106 in section 30b, while shaft 104 is connected to the input of a similar single revolution clutch 108 in that section. The output of clutch 106 drives gear 32 while the output of clutch 108 rotates gear 33. Motor 28 and the gear section 30a are driven continuously by a suitable A/C source indicated in FIG. 4. However, until the clutches 106 and 108 are actuated, no motion is imparted to the gears 32 and 33 connected to their outputs. Clutch 106 is actuated by momentarily closing a switch S mounted on standard 14 and connected between the A/C source and that clutch. Upon actuation, clutch 106 turns gear 32 through one complete revolution. As indicated in the drawing, only a small sector of that gear carries teeth so that upon each closure of switch S the gear 32 will turn gear 26 by an amount depending upon the number of teeth on the gear 32.

In the present instance, the apparatus is milling 72 helical races in a toroidal clutch enclosure. In that clutch enclosure, the pitch of each race R is such that the enclosure and hence the work-table 20 must be turned 5° as the mill M inscribes each rack R. Consequently, the gear 32 has a toothed sector whose angle is such that for each complete revolution of that gear, the gear 26 and work-table 20 are rotated exactly 5°. Furthermore the gear train in gear section 20a is such that gear is rotated very slowly so that the mill M can remove the requisite material to form the finished race R.

As gear 26 is rotated counter-clockwise as indicated, gear 64 is rotated via gear 62 in the same direction. As mentioned previously, the clutch 67 is normally engaged so that that rotary motion is imparted to shaft 68 and, via bevel gears 76 and 78, to yoke 36. Also as noted previously, the clutch section 84b is normally disengaged at this point in the operation of the equipment. Thus as the gear 26 and work-table 20 rotate through 5°, yoke 36 and consequently mill M are rotated approximately 90° from the mill position indicated in FIG. 1 to its position shown in FIG. 2. Thus by the time the mill M reaches its FIG. 2 position, a finished race R will have been inscribed in work-piece W.

As soon as the mill M reaches its FIG. 2 position, the pin 98 on stub shaft 42 trips switch 96, which is normally open, and momentarily closes that switch. As shown in FIG. 4, switch 96 is connected in parallel with a normally open relay 112. One side of this parallel circuit is connected via switch 94, which is normally closed, to the A/C power supply while the opposite side of that parallel circuit is connected through the relay coil 112a to ground, and through clutches 67, 84b and 108 to ground. Thus when switch 96 is closed, the relay coil 112a is energized thereby closing the relay and latching it.

The closing of relay 112 accomplishes several things. First, clutch 67 is disengaged so that gear 26 no longer drives yoke 36. Also, the single revolution clutch 108 is engaged causing gear 33 to make one complete revolution. Gear 33 has a toothed sector which is sized so that upon each revolution of gear 33, gear 26 and consequently work-table 20 are caused to rotate through a selected small angle. In the present instance, the beginning of each race R is spaced 5° from the end of the preceding race in the work-piece. Consequently, the toothed sector on gear 33 is such that upon each rotation of gear 33, gear 26 is rotated through an angle of 5°. Furthermore, to save time, the gear train in gear section 30a driving gear 33 rotates that gear at a fairly rapid rate so that there is minimum lost time between the milling of successive races R.

The closing of relay 112 also engages the clutch section 84b so that simultaneous with the 5° rotation of work-table 20, yoke 36 is turned to return the mill M from its position shown in FIG. 2 to its generally horizontal position illustrated in FIG. 1.

In order to permit the mill M to be returned in this manner, it is retracted from the race R which it has just cut. This can be accomplished by dropping work table 20 relative to pillar 16 by a small fraction of an inch using any suitable hydraulic or solenoid actuated means. In the illustrated embodiment, however, it is accomplished by retracting mill M from the work-piece. More particularly, the fixture 46 supporting mill M is composed of a fixed section 46a secured to yoke 36 and a moving section 46b slidably engaged to the underside of section 46a as shown in FIG. 1. The tool 48 and mill M are affixed to section 46b. The sliding section 46b is movable between a fully extended position shown in FIG. 1 and a retracted position. Section 46b is normally biased towards its extended position by a suitable spring (not shown) acting between sections 46a and 46b. In this extended position, the mill M projects into an unfinished race R sufficiently to remove the requisite amount of material to finish the race. Typically, the milling operation involves the removal of a few thousandths of an inch of material. The sliding section 46b can be moved to its retracted position in opposition to the spring bias by the solenoid 118 affixed to section 46a and having an armature 118a attached to section 46b. When the solenoid 118 is actuated, its armature 118a extends sufficiently to retract mill M from a finished race R.

Section 46b is positively retained in its extended position during each milling operation by a solenoid 122 attached to section 46b. The solenoid has an armature 122a which projects through a passage in section 46b and into a registering passage 124 in section 46a.

Thus the closing of the relay 112 must also energize solenoids 118 and 122 so that the mill M is in its retracted position as the yoke 36 is being returned to its original upright position. Accordingly as seen in FIG. 4, those solenoids are connected in parallel with clutch 67 and clutch section 84b.

Thus as the work table 20 is turning 5° between races, the yoke 36 and mill M are returned to their upright positions illustrated in FIG. 1. The return of the yoke to its initial position is signaled by the pin 98 tripping switch 94. This opens switch 94 thereby deenergizing relay 112 which results in the deenergizing of clutch 67, clutch section 84b and solenoids 118 and 122. Travel of the yoke 36 beyond its original position is prevented by a lug 125 projecting laterally from the yoke which engages a suitable ear 126 projecting laterally from standard 14 near the top thereof.

Also to ensure that the yoke 36 returns to exactly the same position during each cycle of operation of the apparatus, a spring loaded pin 128 is provided in the lug which projects into a suitable recess 130 in the side of standard 14 just ahead of ear 128. Similarly, to ensure that the work table W advances exactly 5° between the end of one race and the beginning of the next race, suitable recesses 132 can be spaced 5° apart around the periphery of work table 20 to receive a spring loaded pin 134, projecting from a fixed structural member (not shown) when table 20 is properly positioned at the beginning of each operating cycle.

We have seen from the foregoing that the movement of work-piece W is coordinated with the movement of mill M to perform a double rotation whereby precisely spaced-apart helical races R are formed in work-piece W. Furthermore, the device which cuts and finishes the races is precisely controlled so that the cutting tool always has the same attack angle relative to the work-piece. Consequently each race R has a uniform cross-section along its entire length from the top of the work-piece to the bottom thereof.

Using the present technique then, toroidal clutch enclosures having spaced-apart helical races can be formed relatively efficiently on a production basis. Furthermore, since the present apparatus is semi-automatic and demands no particular skill of the operator, such enclosures can be manufactured on a large scale at relatively low cost as compared with those made using prior hand fabricating techniques.

The subject apparatus can be automated further if desired by eliminating switch S and actuating the single revolution clutch 102 by means of switch 94 when the yoke 36 returns to its starting position. In that event, a counter may be provided which counts the number of actuations of switch 94 and turns off the apparatus after the milling of a given number of races R in the work-piece. In the present example in which the workpiece W is a toroidal clutch enclosure having 72 races, the counter would count 72 actuations of switch 94, and then open a switch connected between the A/C power supply and the apparatus. Also it is apparent from the foregoing that a multiple-headed tool may be employed to form a plurality of finished races R simultaneously. For example, three tools similar to tool 48 can be positioned 120° apart around axis A and be rotated about axis B in synchronism with table 20 as described above. A second such tool 48 is shown in dotted lines in FIG. 2.

It will thus be seen that the objects set forth above, among those made apparent from the preceding description are efficiently attained, and since certain changes may be made in carrying out the above method and in the construction set forth without departing from the scope of the invention, it is intended that all matter contained in the above description or shown in the accompanying drawing shall be interpreted as illustrative and not in a limiting sense.

It is also to be understood that the following claims are intended to cover all of the generic and specific features of the invention herein described.

I claim:

1. The method of forming helical grooves in a workpiece defining a toroidal enclosure having an axis of symmetry and a circular axis perpendicular to the axis of symmetry and defining a diametric plane through the enclosure comprising the steps of
   A. rotating the work-piece about a first axis corresponding to the axis of symmetry of the toroidal enclosure and perpendicular to the diametric plane of the enclosure.
   B. positioning a cutting tool adjacent to the workpiece so that its cutting end engages the enclosure wall,
   C. rotating the cutting tool about a second axis perpendicular to the first axis and coincident with the circular axis of the enclosure from an initial position adjacent one point on the wall to a final position adjacent another point on the wall, and
   D. rotating the work-piece and tool in synchronism about their axes of rotation so as to maintain the cutting tool at a constant attack angle against the enclosure wall from said initial position to said final position so that the tool cuts a groove in the enclosure wall having a uniform cross section along its length.

2. Apparatus for cutting parallel helical grooves in a work-piece defining a toroidal envelope having an axis of symmetry and a circular perpendicular to the axis of symmetry and defining a diametric plane through the envelope comprising,
   A. means for positioning the work-piece,
   B. means for rotating the work-piece about a first axis corresponding to the axis of symmetry of the toroidal envelope and perpendicular to the diametric plane of the envelope,
   C. means for positioning one or more cutting tools adjacent the work-piece so that each tool can cut grooves in the wall of the envelope,
   D. means for rotating said positioning means about a second axis coincident with the circular axis to the toroidal envelope from an initial position adjacent one point on the work-piece to a final position adjacent another point on the work-piece, and
   E. means for synchronizing the rotation of the work-piece and the rotation of positioning means so as to maintain a tool positioned by the positioning means at a constant attack angle against the work-piece from the initial position to the final position whereby the tool cuts a groove having a uniform cross-section along its entire length.

3. The apparatus defined in claim 2, wherein the positioning means positions a rotary ball end mill.

4. The apparatus defined in claim 2, wherein the two axes of rotation are orthogonal.

5. The apparatus defined in claim 4, and further including
   A. means for decoupling the movements of the work-piece and the positioning means when the final position is reached,
   B. means for separating each tool from the workpiece when said final position is reached, and
   C. means for returning the positioning means to said initial position as the work-piece continues to rotate so that when the initial position is reached, the work-piece will be in the proper position for cutting the next adjacent groove.

6. The apparatus defined in claim 5 wherein the returning means return the positioning means to the initial position at a faster rate than its rate of rotation when operating in synchronism with the work-piece.

* * * * *